(12) United States Patent
Berselli

(10) Patent No.: US 6,263,760 B1
(45) Date of Patent: Jul. 24, 2001

(54) SPEED VARYING DEVICE

(75) Inventor: Francesco Berselli, Bologna (IT)

(73) Assignee: Varvel S.p.A., Bologna (IT)

( * ) Notice: Subject to any disclaimer, the term of this patent is extended or adjusted under 35 U.S.C. 154(b) by 0 days.

(21) Appl. No.: 09/356,258

(22) Filed: Jul. 16, 1999

(30) Foreign Application Priority Data

Jul. 21, 1998 (IT) .......................................... BO98A0454

(51) Int. Cl.$^7$ .................................................. F16H 57/02
(52) U.S. Cl. .......................................................... 74/606 R
(58) Field of Search .............................. 74/606 R, 421 R

(56) References Cited

U.S. PATENT DOCUMENTS

| | | | |
|---|---|---|---|
| 3,673,885 | * | 7/1972 | Hansen ................................. 74/606 R |
| 3,771,381 | * | 11/1973 | Holzhauser et al. ................ 74/606 R |
| 4,431,073 | * | 2/1984 | Nagao et al. ........................ 74/606 R |
| 5,058,456 | * | 10/1991 | Manrique et al. ................... 74/606 R |
| 5,095,767 | * | 3/1992 | Spridco et al. ...................... 74/606 R |
| 6,029,532 | * | 2/2000 | Phillips ............................... 74/421 R |

FOREIGN PATENT DOCUMENTS

| | | |
|---|---|---|
| 387367 | 9/1990 | (EP) . |
| 507309 | 10/1992 | (EP) . |

* cited by examiner

*Primary Examiner*—Charles A. Marmor
*Assistant Examiner*—Ha Ho
(74) *Attorney, Agent, or Firm*—Fay, Sharpe, Fagan, Minnich & McKee, LLP

(57) ABSTRACT

A speed varying device comprises a box body for housing and supporting a set number of gear pairs kinematically connected to each other and to an input shaft and to an output shaft of the speed varying device itself; the box body is defined by a casing, presenting substantially the shape of a cup body and supporting a set number of gears kinematically connected to each other, and by a cover connectable to the casing to close the casing itself, supporting an additional set number of casings; to the cover is associated, or not, internally to the box body and in respective different embodiments of the speed varying device, a wall for supporting a part of the additional set number of gears.

16 Claims, 6 Drawing Sheets

SPEED VARYING DEVICE

BACKGROUND OF THE INVENTION

The present invention relates to a speed varying device.

In particular, the present invention relates to speed reducing device, whereto the description that follows shall refer without thereby losing its general nature.

As is well known, speed reducers are mechanical devices provided with an input shaft and an output shaft, which are respectively connected to a motor and to a user unit and are able to drive the user unit itself with a rotatory motion presenting a lesser speed than the speed whereat the aforementioned input shaft rotates.

Such types of reducers substantially comprise a box body for the containment of a plurality of shafts, whereon are splined gears which, in pairs, mutually transmit motion with appropriate transmission ratios and give rise to the aforementioned driving of the output shaft with lesser speed than that of the input shaft. The velocities of rotation of the input and, respectively, of the output shaft, as well as the value of the torque that the output shaft must transmit to the user unit, determine the choice of motor to be associated to each reducer, and oblige to provide the reducer itself with a number of gear pairs equal to or greater than two.

In a first type of known reducer, when there is a need to obtain a total transmission ratio whose value entails the use of a number of gear pairs greater than two, it is necessary to interpose between a casing and a cover, comprised in the aforesaid box body, an additional sector of casing, which supports at least one pair of gears to be added to those already present. Similarly, the cover also needs to be chosen adequately as a function of the transmission ratio to be attained and of the aforementioned torque value, in order to allow coupling to the reducer a motor able to provide at its output a number of rotations per minute and a power suitable for the requirements.

Obviously, the fact of having to construct and hold in stock an appropriate number both of additional covers and of casing sectors, differing from each other, entails a considerable financial burden. In addition, the fact that the aforementioned box body comprises the three aforesaid parts, mutually connected in pairs with interposition of sealing elements, such as respective gaskets for sealing lubricating fluids, entails considerable component complexity for the reducer described above, as well as a greater likelihood of seepage of the lubricant itself.

In a second type of known reducers the casing is constructed in a single body, and it is fitted internally with an additional casing sector which is always present, both in the case of a reducer with two gear pairs, and in the case of a reducer with three or more gear pairs. Such additional casing sector essentially comprises a wall, provided with a number of holes or housings able to receive respective elements for supporting shafts whereon gears are splined. Such housings are in a sufficient number to accommodate the presence of the maximum number of gear pairs with which the reducers in question can be provided. Therefore, even when the reducer is provided with only two gear pairs, the aforesaid casing is fitted with an additional casing sector of considerable constructive complexity, provided with a number of housings exceeding the number actually necessary and characterized by a needlessly high cost of manufacture. Such cost of manufacture is particularly considerable also due to the fact that the mechanical complex constituted by the casing and by the aforementioned additional sector is obtained by casting, using a core of considerable size due to the presence in the complex itself of ample undercuts.

Also known are reducers of the second type described wherein the aforementioned additional casing sector is manufactured separately from the aforesaid casing, and is connected thereto by means of screws or similar connecting means. In this case as well, the manufacturing and/or storage costs of the additional sector, which in case of utilization of two gear pairs is more complex than necessary, are quite burdensome.

It should also be noted that, also in the previously described reducers fitted with an additional casing sector integral with the casing, it is necessary to be able to associate to the reducers themselves motors presenting different characteristics and able to accommodate the various needs. As a consequence of that fact it is necessary, as in the case of the first type of known reducer described above, to produce and stock a plurality of different types of covers suited to meet the various requirements.

SUMMARY OF THE INVENTION

The purpose of the present invention is therefore to eliminate the drawbacks mentioned above.

The invention, as it is characterized by the claims, solves the problem of providing a speed reducing device, characterized in that it comprises a box body (59") for housing and supporting a set number of gear pairs varying as a function of the speed variation ratio of the device itself, said gear pairs being kinematically connected to each other to transmit the motion between an input shaft and an output shaft of said speed varying device; said box body being defined by a casing which is always the same for any set number of said gear pairs, and presenting substantially the form of a cup-shaped body and supporting a set number of said gears kinematically connected to each other; to said casing being connectable one of at least two covers chosen according to the set number of gears present in the speed varying device; each of said two covers supporting a further set number of said gears complementary to said set number of said gears present in said casing to form said desired variation ratio of said device, and at least to one of said two covers being associated, within said box body, a wall supporting a part of said further set number of gears, which is present only in the case of a pre-set body of said gear pairs and as a function of respective different versions of said speed varying device.

The technical features of the invention, according to the aforesaid aims, can clearly be noted from the content of the claims that follow, and its advantages shall become more readily apparent in the detailed description that follows, made with reference to the accompanying drawings, which represent an embodiment provided purely by way of non-limiting example, in which:

DESCRIPTION OF THE PREFERRED EMBODIMENTS

Figure 1:
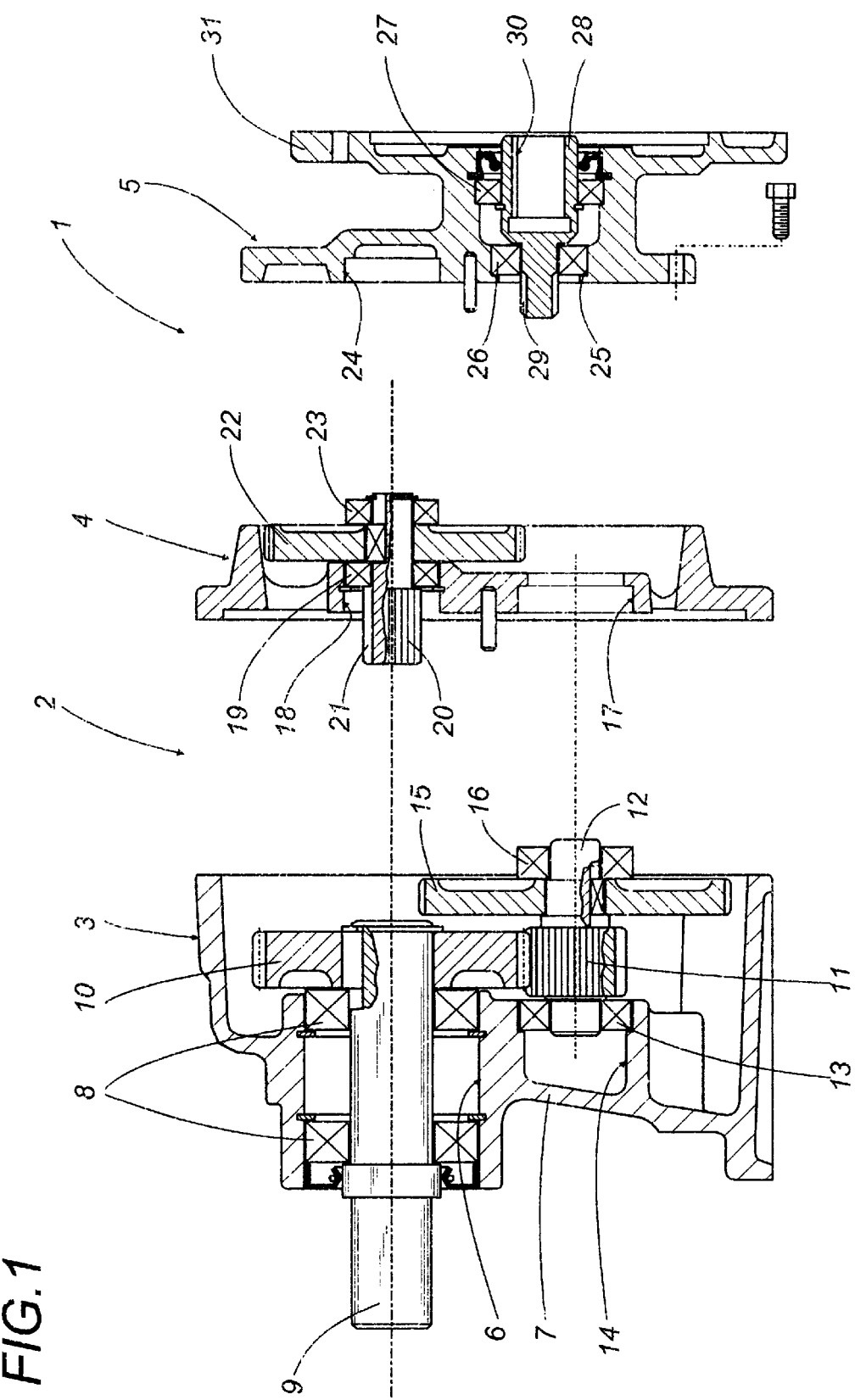
FIGS. 1 and 2 show respective section views of two types of known reducers in the prior art, wherein FIG. 1, shown in a partially exploded view, relates to a reducer of the first type, whilst FIG. 2 relates to a reducer of the second type.

In FIG. 1, the number 1 indicates in its entirety a first type of reducer device known in the art, which comprises a box body 2 constituted by a casing 3, by an additional casing sector 4 and by a cover 5 mutually connected in pairs and in the order described above with interposition of sealing elements for the lubricating fluids not shown.

In the description that follows reference shall be made to a plurality of axes constituting respective geometric entities of reference of respective mechanical details; such axes are all mutually parallel, and they are parallel to the directions of longitudinal development of the reducers which shall be described.

The casing 3 is provided with a hole 6 with horizontal axis, obtained in one of its walls 7 positioned to the left in FIG. 1 and housing within it two ball bearings 8 supporting with their inner rings an output shaft 9 with horizontal axis of the reducer 1, provided with an end portion projecting from the box body 2. On the other end of the shaft 9 is coaxially splined a gear wheel 10, which is engaged with a gear wheel 11 splined (or obtained from the same piece) in correspondence with an intermediate portion of a tree 12 with horizontal axis. The end of the shaft 12 positioned to the left in FIG. 1 is housed inside the inner ring of a ball bearing 13 presenting its own outer ring fitted within a hole 14 obtained in an internal position of the casing 3 located below the hole 6, while, to the side of the gear wheel 11, on the shaft 12 is coaxially splined a further gear wheel 15. The right-side end of the shaft 12 is housed inside the inner ring of a bearing 16, whose outer ring is fitted within a hole 17 with which the aforesaid additional casing sector 4 is provided.

Such additional casing sector 4 is further provided, above the hole 17, with a hole 18 with horizontal axis within which is fitted the inner ring of a ball bearing 19 supporting coaxially with its inner ring a median portion of a shaft 20. On an end portion of such shaft 20 positioned to the left in FIG. 1 is splined (or obtained from the same piece) a gear wheel 21 able to engage, in use, with the aforementioned gear wheel 15, whilst immediately to the right of the bearing 19 the shaft 20 bears splined an additional gear wheel 22. The right end portion of the shaft 20 is housed within the inner ring of a ball bearing 23, whose outer ring can be housed inside a cavity 24 present in the aforementioned cover 5.

Inside a hole 25 of the cover 5, positioned below the cavity 24, are housed the outer rings of two ball bearings 26 and 27 coaxially set side by side, positioned respectively to the left and to the right in FIG. 1, whose inner rings are fitted around the respective areas of a shaft 28 with horizontal axis.

On the end of shaft 28 positioned to the left in FIG. 1 is splined (or obtained from one piece) a gear wheel 29, able to co-operate, in use, with the aforementioned gear wheel 22.

The right end of the shaft 28 is provided coaxially with a cavity 30 able to be engaged by the output shaft (not shown) of a motor that is not shown, which is connectable to a flange 31 comprised in the cover 5 by means of connecting elements constituted, for instance, by screws (not shown).

The reducer 1 just described is provided with three pairs of gear wheels 10, 11, 15, 21 and 22, 29, and it is of the first type described in the premises to the present description.

As briefly mentioned, if in the reducer 1 in question only two pairs of gear wheels are to be used, it is necessary to replace both the additional casing sector 4, and the cover 5.

Figure 2:
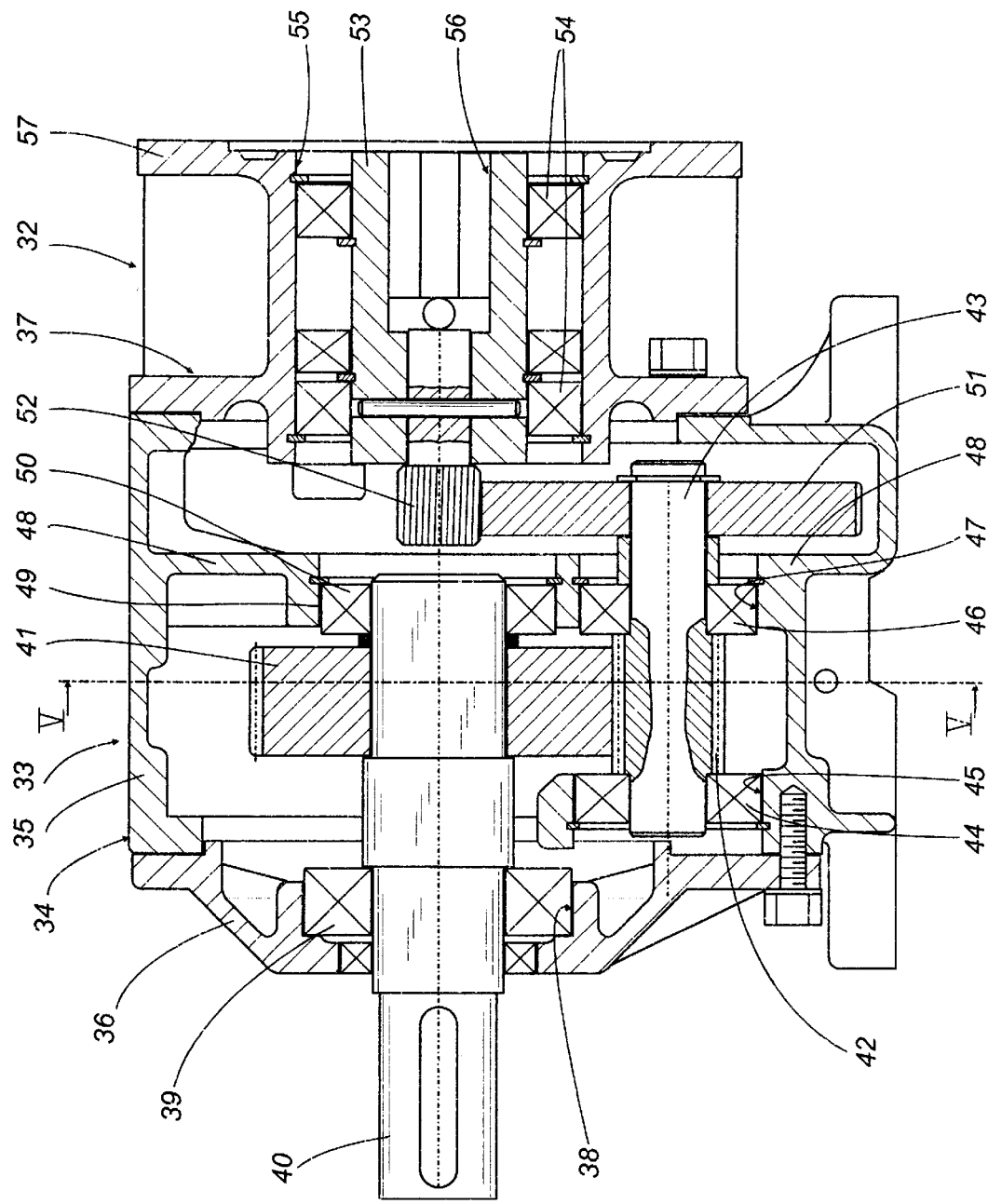
Figure 3:
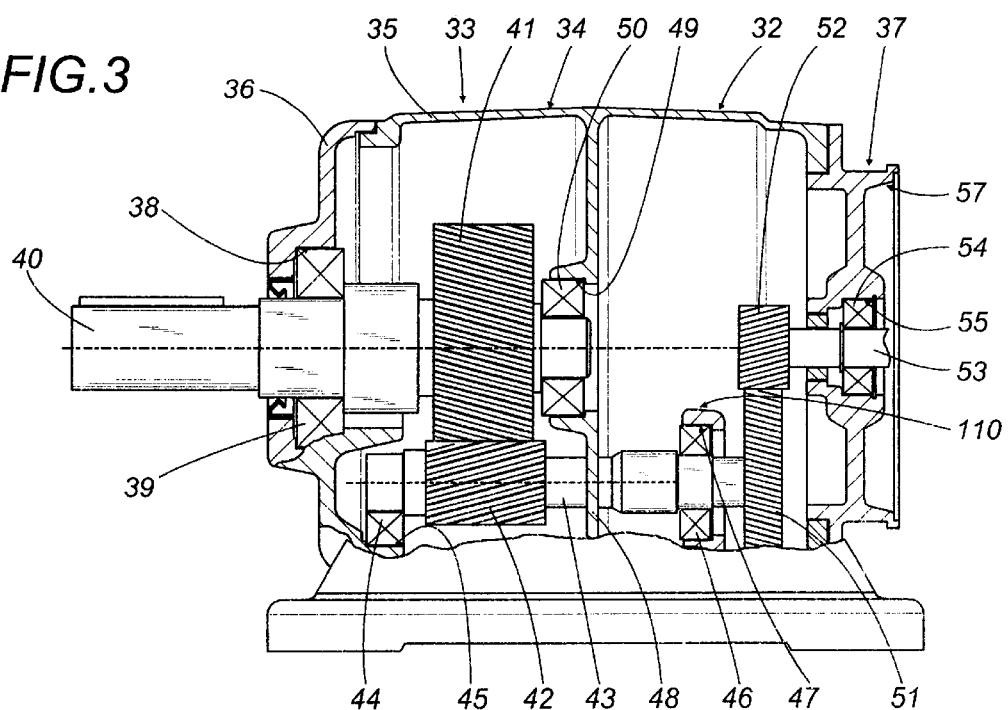
FIGS. 3 and 4 show respective section views, with some parts removed, of an additional known reducer, of the second type, comprised in the prior art, wherein, in particular, FIG. 3 relates to a reducer with two pairs, whilst FIG. 4 relates to the same reducer as in FIG. 3 used for three pairs.

FIGS. 2 and 3 show a reducer 32 of the second type described in the premises to the present description.

Such reducer 32, of the type with two gear pairs, comprises a box body 33 constituted by a casing 34, in turn constituted by a substantially cylindrical element 35 closed, in correspondence with its end positioned to the left in FIGS. 2 and 3, by a cover 36, and, in correspondence with its end positioned to the right, by a cover 37. The axial ends of the element 35 and the respective covers 36 and 37 are mutually connected with interposition of sealing gaskets not shown.

The cover 36 is provided with a hole 38 with horizontal axis, housing within it a ball bearing 39 supporting with its inner ring an output shaft 40 of the reducer 32 with horizontal axis, provided with an end portion projecting from the box body 33. On the other end of the shaft 40 is coaxially splined a gear wheel 41, which is engaged with a gear wheel 42 splined (or obtained from the same piece) in correspondence with an intermediate portion of a shaft 43 with horizontal axis.

As shown in FIGS. 2 and 3, the end of the shaft 43, positioned to the left in FIGS. 2 and 3, is housed within the inner ring of a ball bearing 44 presenting its own outer ring fitted within a hole 45 obtained in an inner portion of the casing 34 located below the hole 38.

As shown in FIG. 2, in proximity with the right side of the gear wheel 42, on the shaft 43 is fitted the inner ring of a ball bearing 46 whose outer ring is housed within a hole 47 obtained in a wall 48 which, perpendicularly to the axis of the shaft 40, transversely delimits an intermediate inner area of the casing 34.

In such wall 48, above the hole 47, is present a hole 49 housing the outer ring of a ball bearing 50, whose inner ring is fitted coaxially to a right end portion of the aforementioned shaft 40.

On the right end portion of the shaft 43 is splined coaxially a gear wheel 51, which is engaged with a further gear wheel 52 splined on a left end portion of a shaft 53, which is supported in a rotating manner by means of two ball bearings 54 housed within a hole 55 obtained in the aforesaid cover 37.

The right end of the shaft 53 is coaxially provided with a cavity 56 able to be engaged by the output shaft of a motor not shown herein, which is connectable to a flange 57 comprised in the cover 37 by means of connecting elements constituted, for instance, by screws (not shown).

The reducer 32 just described is provided with two reduction stages constituted by two pairs of gear wheels 41, 42 and 51, 52, and, as specified above, it is of the second type considered in the premises of the present description.

Figure 7:
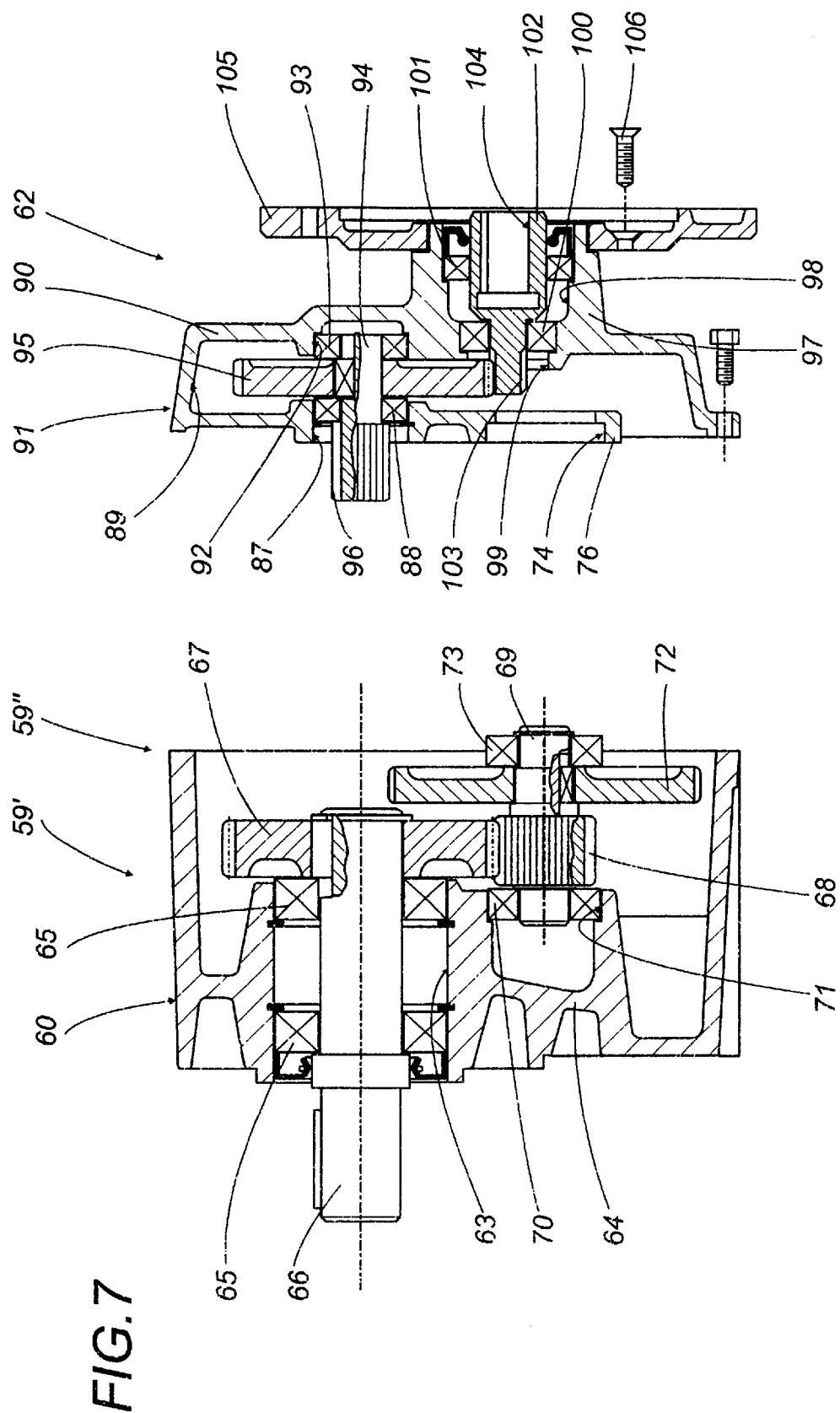
FIG. 7 shows a sectioned and partially exploded view of a reducer with three gear pairs realized in accordance with the present invention.

As mentioned, to the casing 34 of the reducer 32 is stably associated the aforesaid wall 48, better shown in the schematic FIG. 7, wherein are always present, although used only in part as in the case just described, the aforementioned holes 47 and 49 and an additional ground hole 58; the hole 58 is able to house possible means for supporting a third gear pair, and, as specified above, its presence, in the case of use of only two gear pairs, entails needlessly high costs to manufacture the casing 34 and, as a result, the entire reducer 32.

Figure 5:
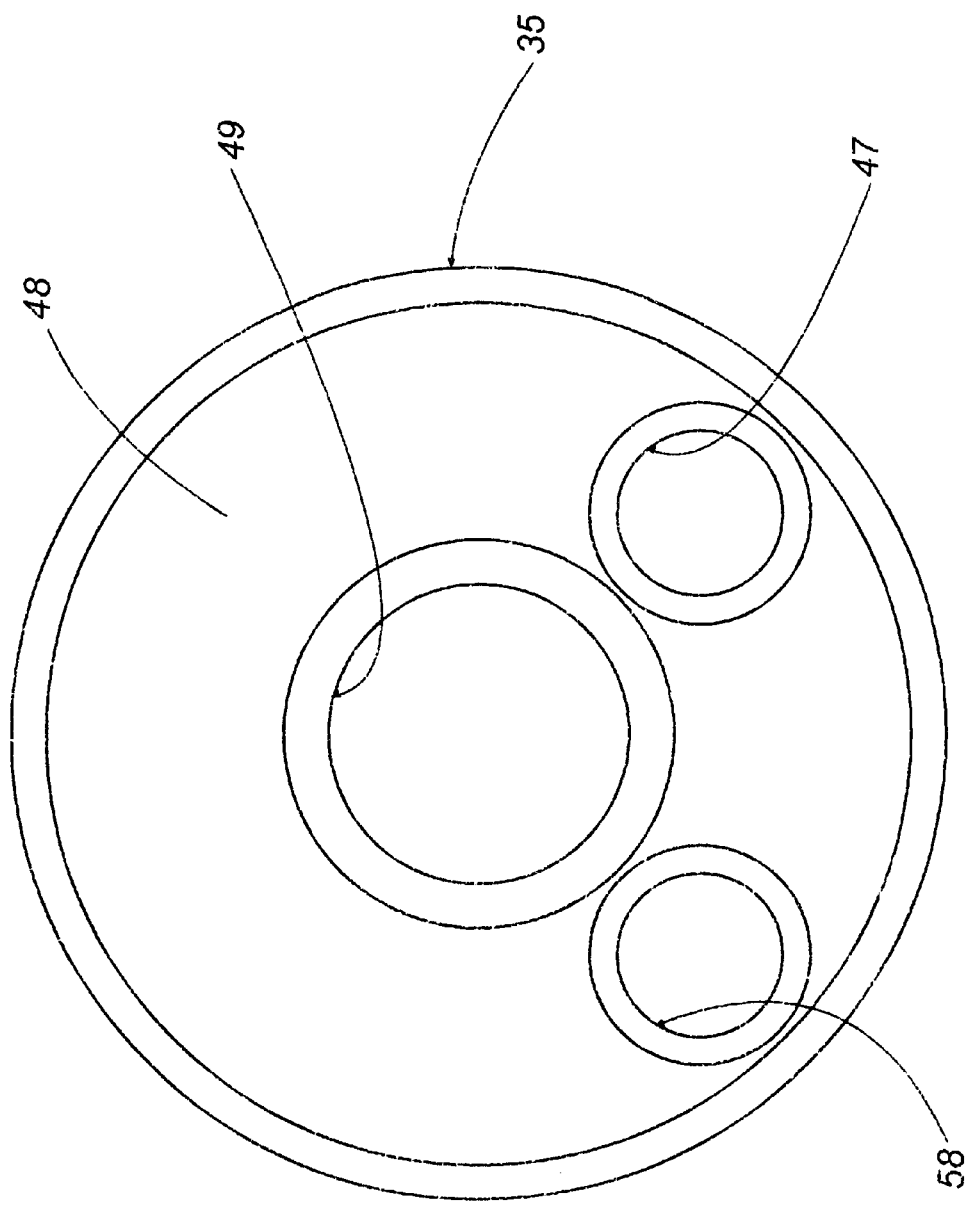
FIG. 5 shows a schematic and partial view of a detail of FIG. 2, obtained by sectioning FIG. 2 itself with a plane V—V.

Similarly to what is shown in FIG. 2, as shown in FIG. 3, in proximity to the right side of the gear wheel 42, the shaft 43 passes through a ground hole, not shown in FIG. 3 and obtained in a wall 48 which, perpendicularly to the axis of the shaft 40, transversely delimits an inner intermediate area of the casing 34. The hole through which the shaft 43 passes corresponds to the hole 58 of FIG. 5 and its wall 48 corresponds to the wall 48 of FIG. 2.

To the right of the wall 48 of FIG. 3, on the shaft 43 is fitted the inner ring of a ball bearing 46 whose outer ring is housed within a hole 47 obtained in a wall 110 with which the casing 34 is provided. To the right end of the shaft 43 of FIG. 3 is splined a gear wheel 51 which engages a further gear wheel 52 splined on a left end portion of a shaft 53, which is supported rotatorily by means of a ball bearing 54 housed inside a hole 55 obtained in the aforesaid cover 37.

In the case shown in FIG. 3 the shaft 53 can coincide with the output shaft of a motor not shown, which is connectable to the flange 57 comprised in the cover 37 by means of connecting elements known in the art and not shown.

Similarly to the reducer 32 shown in FIG. 2, also the reducer 32 described above with reference to FIG. 3 is provided with two reduction stages constituted by two pairs of gear wheels 41, 42 and 51, 52, and, as specified above, it is of the second type considered in the premises of the present description.

Figure 4:
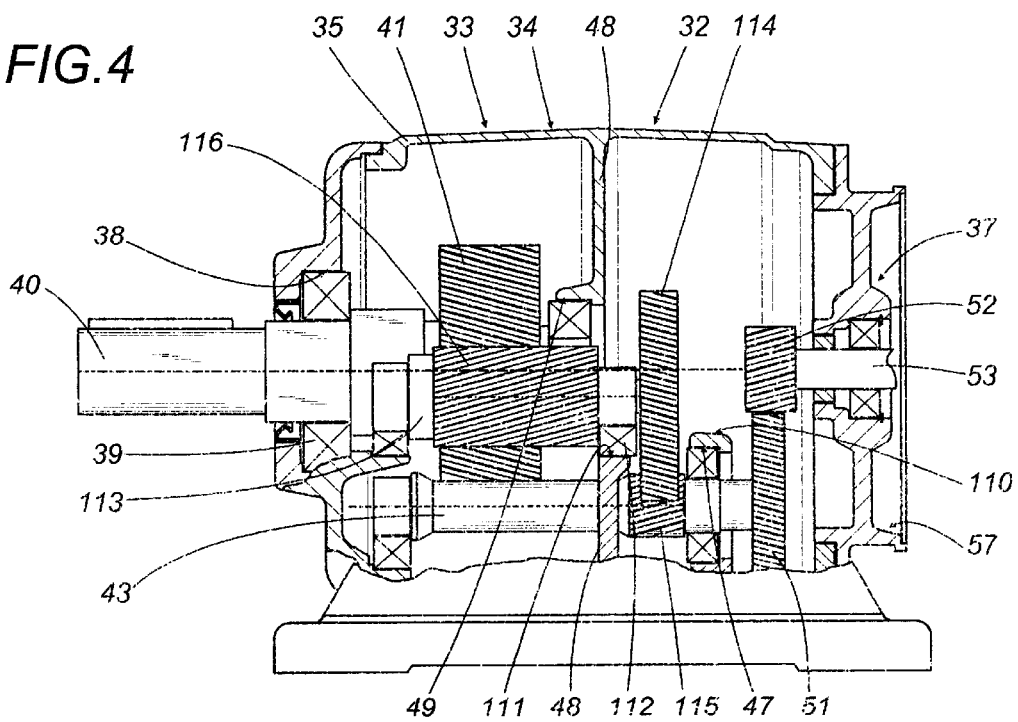

FIG. 4 shows the same reducer as in FIG. 3, but provided with three reduction stages. In particular the wall 48 is sectioned according to two different planes whereof one coincides with the section plane of FIG. 3 and the other one is offset with respect to the axis of the shaft 40 towards an observer looking at FIG. 4. This second section plane highlights that the wall 48 is provided, in addition to the aforementioned hole 49, with a further hole 111 which supports, by means of a bearing 112, the right end of an additional shaft 113. The shaft 113 is provided, to the right of the hole 111, with a wheel 114 which enmeshes with a second wheel 115 obtained on the shaft 43.

As shown in FIG. 4, the shaft 113 is driven by shaft 43 through the reduction pair constituted by the wheel 115 and by the wheel 114, and it is provided with a wheel 116 that enmeshes with the wheel 41. In particular the wheel 116 and the wheel 41 constitute an additional reduction stage. The reducer shown in FIG. 4 is thus provided with three reduction stages, constituted by the three pairs of gear wheels indicated, respectively with the numbers 51, 52, 114, 115, and 116, 41.

Also in the case shown in FIG. 4, to the casing 34 of the reducer . 32 is stably associated the aforementioned wall 48, which in the case shown in FIG. 3 is identical to the one shown in FIG. 4, and in the case of FIG. 3 relating to a reducer with two reduction stages, in wall 48 are still present, although used only partially as in the case just described, the aforementioned holes 47 and 49 and a further hole 111 shown only in FIG. 4.

Also in this additional case shown in FIGS. 3 and 4, the hole 111 is present both for the reducer with two reduction stages, and for the reducer with three reduction stages.

Figure 6:
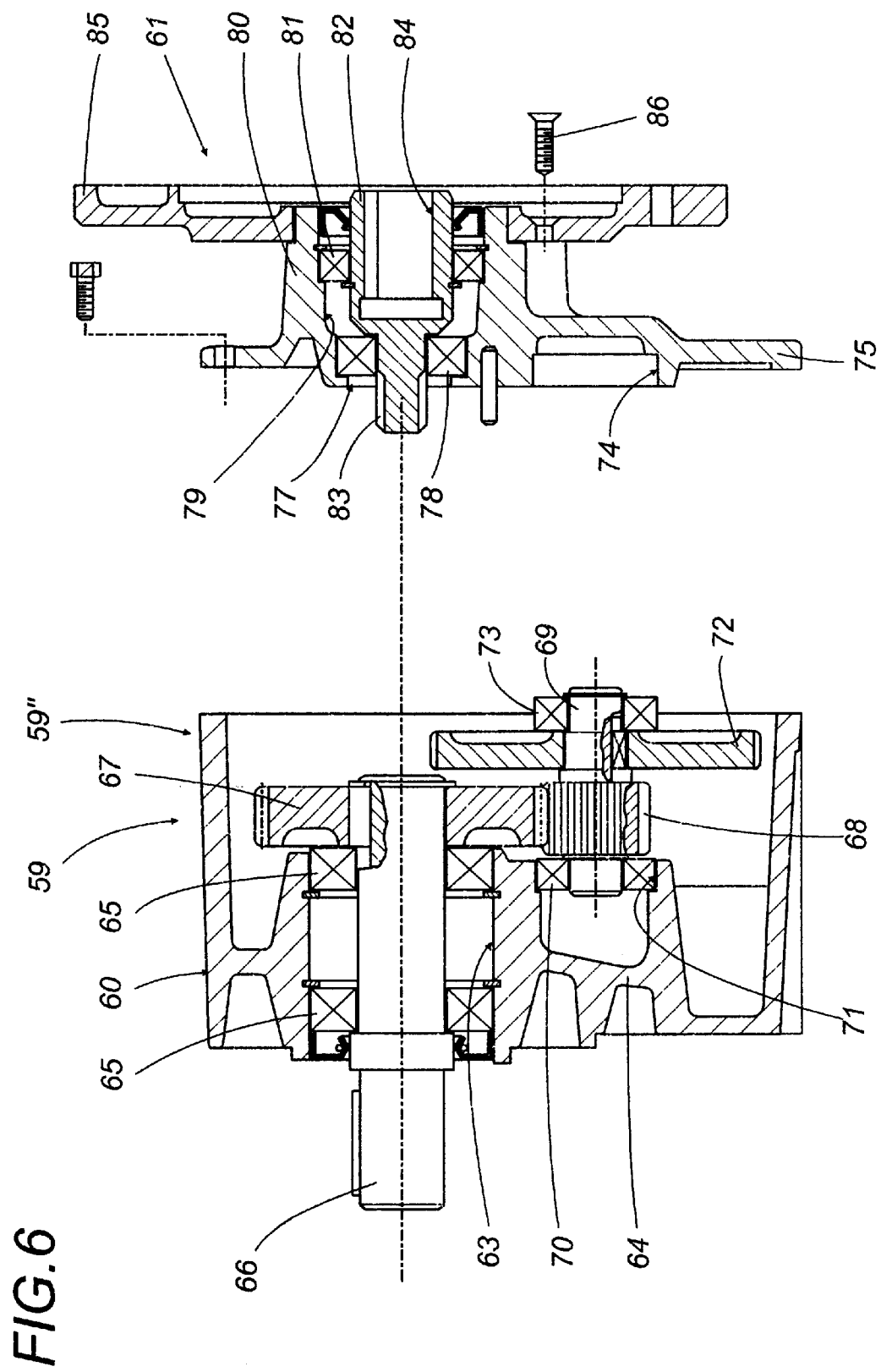
FIG. 6 shows a sectioned and partially exploded view of a reducer with two gear pairs realized in accordance with the present invention.

FIGS. 6 and 7 respectively show two reducers 59 and 59' realized in accordance with the present invention, provided respectively with two and with three gear pairs.

Both reducers 59 and 59' comprise a box body 59" defined by a casing 60 having the shape of a cup body with the bottom located to the left in the figures in question, and which is always the same for any type of reducer, both in the case wherein the reducer presents two reduction stages, and in the case wherein the reducer presents three reduction stages. The inlet of such casing 60, positioned to the right in FIGS. 6 and 7, is closed by a cover comprised in the box body 59" and indicated respectively, in FIGS. 6 and 7, with the numbers 61 and 62. Such covers 61 and 62, as shall become readily apparent hereafter, differ from each other.

The casing 60 is provided with a hole 63 with horizontal axis, obtained in its wall 64 located to the left in FIGS. 6 and 7 and housing within it two ball bearings 65 supporting with their inner rings an output shaft 66 of the reducer 59, with horizontal axis, provided with an end portion projecting from the casing 60. On the other end of the shaft 66 is coaxially splined a gear wheel 67, which is engaged with a gear wheel 68 splined (or obtained from one piece) in correspondence with an intermediate portion of a shaft 69 with horizontal axis. The end of the shaft 69 positioned to the left in FIGS. 6 and 7 is housed inside the inner ring of a ball bearing 70 presenting its own outer ring fit inside a hole 71 obtained in an inner portion of the casing 60 positioned below the hole 63, whilst, to the side of the gear wheel 68, on the shaft 69 is coaxially splined a further gear wheel 72. The right end of the shaft 69 is housed inside the inner ring of a bearing 73, whose outer ring is fitted within a hole 74 obtained in a wall 75, 76, respectively delimiting the left side in the covers 61 and 62.

As shown in FIG. 6, in a portion of the wall 75 overlying the hole 74 is obtained a further hole 77 with horizontal axis, within which is coaxially housed the outer ring of a ball bearing 78 whose function shall become readily apparent hereafter. An end of such hole 77 positioned to the right in FIG. 3 communicates with an inner cavity 79 of a sleeve 80 coaxial to the hole 77 itself and presenting its left end integral with the wall 75. Within the sleeve 80 is coaxially housed a ball bearing 81, which, in combination with the aforementioned bearing 78, supports in a rotatary manner a shaft 82 on whose end portions positioned within the casing 60 and extending leftwards in FIG. 6 is splined (or obtained from the same piece) a gear wheel 83 able to co-operate with the aforementioned gear wheel 72.

The right end of the shaft 82 is provided coaxially with a cavity 84 able to be engaged by the output shaft of a motor not shown herein, which is connectable to a flange 85, comprised in the cover 61 and connected to the right end of the sleeve 80, through connecting elements constituted, for instance, by screws 86.

As shown in FIG. 7, the aforementioned wall 76 partially delimits the left flank of the cover 62 oriented towards the casing 60, and it is provided, in correspondence with its portion overlying the hole 74, with an additional hole 87 with horizontal axis, within which is coaxially housed the outer ring of a ball bearing 88 whose function shall become readily apparent hereafter. One end of such hole 87 positioned to the right in FIG. 7 communicates with a cavity 89 included between the wall 76 and a wall 90 defining the base, situated to the right of the wall 76 in FIG. 7, of a cup body 91 constituting substantially the body of the cover 62.

An upper portion of the wall 90 is provided with a blind hole 92 coaxial to the aforementioned hole 87, within which is housed the outer ring of a ball bearing 93 which, in combination with the aforementioned bearing 88, supports in a rotatary manner a shaft 94 on whose median portion is splined a gear wheel 95. On the end portion of the shaft 94 positioned internally to the casing 60 and extending leftwards in FIG. 7 is splined (or obtained from the same piece) a gear wheel 96 able to co-operate with the aforementioned gear wheel 72.

To the surface of the wall 90 positioned to the right, in FIG. 7, and oriented towards the exterior of the cover 62 is connected a sleeve 97 developing along a horizontal axis and presenting its own left end integral with the wall 90 itself. The sleeve 97 is provided internally with a cavity 98 coaxial thereto, whose left end is coaxially adjacent to a hole 99 obtained in the wall 90. Within such hole 99 is coaxially housed a ball bearing 100, which co-operates with a ball bearing 101 housed coaxially within the sleeve 97 to support in a rotatory manner a shaft 102 with horizontal axis, on whose end portion positioned internally to the casing 60 and extending leftwards in FIG. 7 is splined (or obtained from the same piece) a gear wheel 103 able to co-operate with the aforementioned gear wheel 95.

The right end of the shaft 102 is provided coaxially with a cavity 104 able to be engaged by the output shaft of a motor not shown herein, which is connectable to a flange 105, comprised in the cover 62 and connected to the right end of the sleeve 97 through connecting elements constituted, for instance, by screws 106. The flanges 85 and 105 associated respectively to the covers 61 and 62, present such dimensions and shapes that they can be associated to the most suitable motor, respectively, for association to the reducer 59 of FIG. 3 or to the reducer 59' of FIG. 7.

In particular, the flanges 85 and 105 present mutually different dimensions and/or conformation, in that, in the case wherein the wall 76 is present, as in the reducer 59' of FIG. 7, the motor (not shown) able to be associated to the reducer 59' shall preferably be less powerful, and hence smaller, for the same value of torque output by shaft 66, than the motor associated to the reducer 59.

The reducers 59 and 59' represented in FIGS. 6 and 7 operate in a way known in itself, the motion being imparted to the reducers 59 and 59' themselves through the respective input shafts 82 and 102, and such motion being, respectively through the gear pairs 83, 72, 68, 67 and 103, 95, 96, 72, 68, 67, transmitted to the respective output shafts 66.

For the realization of the reducers 59 and 59', as stated, the same casing 60 is used, with all the components contained therein, whilst it is sufficient to associate to the casing 60, respectively, the cover 61 or 62 (with the elements associated thereto) to obtain the reducer 59 with two gear pairs or the reducer 59' with three gear pairs.

From the above description it is evident that the reducers 59 and 59' fully attain the intended aim, since for their realization, in addition to the casing 60 and to the related internal components, common to both, it is sufficient to realize and keep in stock only the different types of covers (and the components associated thereto) able to meet the various requirements.

Note that, thanks to their conformation, the reducers 59 and 59' described above present greater rigidity than the reducers realized in accordance with the prior art, and the complexes constituted by the casing 60 and by the covers 61, 62 thereto respectively and alternatively associated are able to guarantee an excellent seal to fluids, preventing the seepage of lubricating substances.

The invention thus conceived can be subject to numerous modifications and variations without thereby departing from the scope of the inventive concept.

For instance, the wall 76 may not constitute a part of the cover 62, and it may be connected to such cover 62 through connecting elements constituted, for instance, by screws.

Lastly, it should be noted that all components described could be replaced with technically equivalent elements.

What is claimed is:

1. Speed varying device, comprising a box body for housing and supporting a set number of gear pairs variable according to the speed variation ratio of the device itself, said gear pairs being kinematically connected to each other to transmit the motion between an input shaft and an output shaft of said varying device, said box body being defined by a casing which is always the same for any set number of said gear pairs, and presenting substantially the shape of a cup body and supporting a first group of said gears kinematically connected to each other; said casing being connectable to one of at least first and second covers chosen according to the set number of gear pairs present in the speed varying device; each of said first and second covers supporting a second group of at least one gear complementary to and forming said set number of gear pairs with said first group of gears, said at least one gear of said second gear group completely supported by a respective one of said first and second covers; and said second cover comprising, internally to said box body, a wall for supporting a part of said second gear group.

2. Device according to claim 1, wherein, in the case in which said box houses two gear pairs, said device comprises said first cover.

3. Device according to claim 1, wherein, in the case in which said box body houses three said gear pairs, said device comprises said second cover which has said wall.

4. Device according to claim 2, wherein said casing supports and houses a first gear pair connected to said output shaft, and a first gear coaxially integral to a gear of said first pair; said first cover supporting a second gear in engagement with said first gear and connected to said input shaft, said first and second gears constituting a second gear pair, said first cover further defining a support opening for partially rotatably supporting a shaft projecting coaxially from said first gear.

5. Device according to claim 3, wherein said casing supports and houses a first gear pair connected to said output shaft, and a first gear coaxially integral with a gear of said first pair; said second cover supporting, with the aid of said wall, a second gear pair connected to said input shaft, and a second gear coaxially integral to a gear of said second pair; and said first and second gears constituting a third gear pair, said wall of said second cover defining a support opening for partially rotatably supporting a shaft projecting coaxially from said first gear.

6. Device according to claim 1, wherein said wall is defined as a one-piece construction with said second cover.

7. Device according to claim 1, wherein said wall is connected in a removable manner to said second cover.

8. Device according to claim 6, wherein said wall is positioned perpendicular to a direction of longitudinal development of said speed varying device.

9. Device according to claim 6, wherein said wall is positioned perpendicular to the axes of rotation of said gears.

10. Device according to claim 1, wherein each of said first and second covers comprises a flange adapted for connection to an associated motor for actuating said speed varying device; said flange of said first cover presenting at least different dimensions relative to said flange of said second cover.

11. Device according to claim 1, wherein said speed varying device is a speed reducer.

12. Device according to claim 3, wherein said wall is defined as a one-piece construction with said second cover.

13. Device according to claim 3, wherein said wall is connected in a removable manner to said second cover.

14. Device according to claim 7, wherein said wall is positioned perpendicular to a direction of longitudinal development of said speed varying device.

15. Device according to claim 7, wherein said wall is positioned perpendicular to the axes of rotation of said gears.

16. Device according to claim 8, wherein said wall is positioned perpendicular to the axes of rotation of said gears.

* * * * *